(12) United States Patent
Suzuki et al.

(10) Patent No.: US 6,653,576 B2
(45) Date of Patent: Nov. 25, 2003

(54) SENSOR UNIT AND CONTROL SYSTEM OF THE SAME

(75) Inventors: Katsuji Suzuki, Shizuoka (JP); Toshihiko Ikoma, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 295 days.

(21) Appl. No.: 09/858,548

(22) Filed: May 17, 2001

(65) Prior Publication Data

US 2001/0047892 A1 Dec. 6, 2001

(30) Foreign Application Priority Data

May 23, 2000 (JP) ........................................ 2000-151616

(51) Int. Cl.[7] ........................ G01G 23/01; G01G 19/08
(52) U.S. Cl. ...................... 177/25.13; 177/136; 73/1.13
(58) Field of Search ........................... 177/25.11, 25.12, 177/25.13, 50, 136–141; 73/1.13; 702/101

(56) References Cited

U.S. PATENT DOCUMENTS

| | | | | |
|---|---|---|---|---|
| 4,804,052 A | * | 2/1989 | Griffen .......................... | 177/50 |
| 4,815,547 A | * | 3/1989 | Dillon et al. ................. | 73/1.13 |
| 5,623,128 A | * | 4/1997 | Grimm et al. ............ | 177/25.13 |
| 5,710,716 A | | 1/1998 | Hurst et al. .................. | 364/508 |
| 5,780,782 A | * | 7/1998 | O'Dea ......................... | 177/136 |
| 5,841,077 A | * | 11/1998 | Kolaci ....................... | 177/25.11 |
| 5,878,376 A | * | 3/1999 | Schurr ...................... | 177/25.13 |
| 6,459,367 B1 | * | 10/2002 | Green et al. ................ | 702/101 |

FOREIGN PATENT DOCUMENTS

JP          11132837          5/1999

* cited by examiner

Primary Examiner—Randy Gibson
(74) Attorney, Agent, or Firm—Armstrong, Westerman & Hattori, LLP

(57) ABSTRACT

A sensor unit having a sensor and an adjustment unit is welded to a vehicle. After the mounting of the sensor unit, a receiver unit externally receives modification information for modifying the load signal adjustment. Thereby, the load signal outputted from the sensor is adjusted by the adjustment unit responsive to the modification information to be externally outputted. Thus, after the mounting of the sensor unit, the receiver unit receives the modification information, and the adjustment unit adjusts the load signal supplied from the sensor based on the modification information. This allows the sensor unit to unitarily have the sensor and the adjustment unit. Thereby, the adjustment unit can be modified by the modification information externally supplied. Accordingly, the sensor unit with the adjustment unit can be applied to various types of vehicles.

4 Claims, 7 Drawing Sheets

SENSOR UNIT AND CONTROL SYSTEM OF THE SAME

BACKGROUND OF THE INVENTION

1. Field of the Invention

The present invention relates to a sensor unit and a control system including the sensor unit. Particularly, the sensor unit unitarily has a sensor fitted to an automobile vehicle for producing a load signal responsive to a load carried by the vehicle and an adjustment means adjusting the load signal supplied from the sensor to output externally the adjusted load signal.

2. Related Art

A vehicle dead weight measurement has been applied mainly to a larger-sized vehicle such as a truck to prevent turn over of the vehicle due to an over-load condition thereof at a traffic accident or to decease degradation of the vehicle due to the over load. A conventional dead weight measurement of the vehicle, in which the vehicle is carried on a platform weighing machine, requires a large scale facility with a wide space. This limits the number of the platform weighing machines to be unsuitable for weight-measurement of a large number of the vehicles. Furthermore, the platform weighing machine requires a larger installation cost thereof.

Recently, a weight meter mounted on a vehicle has been proposed to measure the dead weight thereof. The weight indicator has, for example, a plurality of weight measuring sensors such as a strain gauge. The weight measuring sensors are mounted at fore, aft, left, and right positions of a carrier frame of the vehicle to sum outputs responsive to sensed loads, obtaining a dead weight of the vehicle. Each of the sensors is mounted on an arc-shaped leaf spring disposed between a vehicle axle and an end of the carrier frame.

The sensors are positioned at pre-determined positions near the axles and are connected to a weight meter through electrical cables. An amplifier is disposed in a cable line led to the weight meter for amplifying a load signal output from each of the sensors. The amplifier amplifies the load signals to eliminate an influence of noises generated by vibrations of the vehicle.

However, the conventional weight meter has a disadvantage that plural types of amplifiers should be provided for different types of vehicles, when the weight meter is connected to a sensor through an amplifier, because the amplifier should have an amplification ratio fit for each type of the vehicles.

The sensor is welded to an axle support or a shackle pin of the vehicle. The welding may vary the output of the sensor. Thus, the amplifier has an adjustment element such as a volume in a circuit thereof. After the welding of the sensor, a worker removes a waterproof case cover of the sensor to adjust the volume of the sensor with a screwdriver for an offset adjustment of the sensor.

Therefore, the amplifier should be arranged at a position where the worker can easily handle it, so that the amplifier is not disposed near the sensor welded to the vehicle axle support. However, it is preferable that the load signal of the sensor is amplified or adjusted near the sensor in consideration of an influence of a noise. Thus, an adjustment means like an amplifier which can be disposed near the sensor has been desired. However, a conventional adjustment component as an adjustment means is adjusted with a screwdriver by hand. Thus, it is difficult to correctly adjust the amplifier, which causes a troublesome work, since the adjustment component becomes misaligned when the screw driver releases the adjustment component.

SUMMARY OF THE INVENTION

In view of the above-mentioned disadvantage of the conventional art, an object of the present invention is to provide a sensor unit having an adjustment means and a sensor which are unitarily assembled and or to provide a sensor unit control system for adjusting the sensor unit.

Referring to a block diagram illustrated in FIG. 1, the present invention will be discussed.

For achieving the object, a first aspect of the present invention is a sensor unit having a unit main body unitarily including a sensor 11 fitted to an automobile vehicle for producing a load signal responsive to a load carried by the vehicle and an adjustment means 12 adjusting the load signal supplied from the sensor 11 to output externally the adjusted load signal. The sensor unit further has a receiver means 15 positioned outside of the unit main body for receiving modification information for modifying the adjustment of the load signal, and the adjustment means 12 adjusts the load signal to output the load signal after the receiver means 15 receives the modification information.

The sensor unit having the sensor 11 and the adjustment means 12 is welded on the vehicle. After the mounting of the sensor unit, the receiver mean receives externally the modification information for modifying the load signal adjustment. Thereby, the load signal outputted from the sensor 11 is adjusted by the adjustment means 12 responsive to the modification information to be externally outputted. Thus, after the mounting of the sensor unit, the receiver mean receives the modification information, and the adjustment means 12 adjusts the load signal supplied from the sensor 11 based on the modification information. This allows the sensor unit to unitarily have the sensor 11 and the adjustment means 12. Thereby, the adjustment means 12 can be modified by the modification information externally supplied. Hence, the sensor unit with the adjustment means 12 can be applied to various types of vehicles. This eliminates the offset adjustment required after the mounting of the prior-art sensor, decreasing handwork of the adjustment.

Preferably, the receiver means 15 serves as a coupler for connection to an external instrument.

Thus, the connection of the receiver mean to the external instrument allows the sensor unit to connect to the external instrument with ease. That is, the receiver mean can be located at a position where it is easily connected to the external instrument, even when the sensor unit is mounted near the vehicle axle. This further decreases handwork of the adjustment.

Preferably, the receiver means 15 receives externally an output timing signal of the load signal, and the adjustment means 12 outputs the load signal in response to the output timing signal received by the receiver means 15.

Thus, the load signal can be outputted responsive to the received output timing signal, so that the load signal supplied from the sensor 11 is outputted responsive to an operation of the external instrument. This allows the sensor unit to easily co-operate an external instrument such as a vehicle instrument unit or a vehicle control unit, improving the sensor unit as a commercial product.

A sensor unit control system according to the present invention has the sensor unit described in the first invention aspect. The control system includes a modification information producing means 30a1 for producing the modification information responsive to a state of the vehicle and a transmission means 30a2 for transmitting the modification information produced by the modification information producing means 30a1 to the receiver means 15 of the sensor unit.

In the sensor unit control system, the modification information producing mean produces the modification information for adjustment responsive to a gain and a temperature of the vehicle. The modification information is supplied to the receiver mean 15 of the sensor unit by the transmission means 30a2. The sensor unit externally outputs the load signal adjusted responsive to the received modification information. Thus, the modification information which is produced particularly for a vehicle provided with the sensor unit is transmitted to the sensor unit, so that the sensor unit outputs the load signal adjusted responsive to the modification information. Thereby, the sensor unit having the sensor 11 and the adjustment means 12 can be easily adjusted. Hence, the modification information can adjust the sensor unit responsive to the type of the vehicle. Accordingly, the control system having the sensor unit can be applied to various different types of vehicles.

Preferably, the sensor unit control system further includes a load data receiver means 30g1 for receiving load data which are outputted from the sensor unit, the load data being related to the load signal. The modification information producing means 30a1 produces the modification information based on pre-provided vehicle weight data and the load data received by the load data receiver means 30g1.

Thus, the modification information can be produced based on the load data supplied from the sensor unit and the pre-provided vehicle weight data showing a reference load of the vehicle. Accordingly, even if the output of the sensor 11 would vary due to the welding of the sensor 11, the adjustment means 12 can be adjusted based on the load signal supplied from the sensor unit. This allows a correct adjustment of the adjustment means of the sensor unit.

Preferably, the sensor unit control system further includes a vehicle weight measuring means 40 for measuring a vehicle weight of the vehicle to output vehicle weight data, and the control system also has a vehicle weight receiver means 30g2 for receiving the vehicle weight data from the vehicle weight measuring means 40. The modification information producing means 30a1 provides the vehicle load data based on the vehicle weight data received by the vehicle weight receiver means 30g2.

Thus, the modification information is produced based on the vehicle weight data and the load data supplied from the sensor unit, and the vehicle weight data are actually measured by the vehicle weight measuring means 40. This allows a more correct adjustment of the control mean of the sensor unit.

DETAILED DESCRIPTION OF PREFERRED EMBODIMENT

Referring to FIGS. 2 to 8, embodiments of a sensor unit and a sensor unit control system according to the present invention will be discussed hereinafter.

Figure 1:
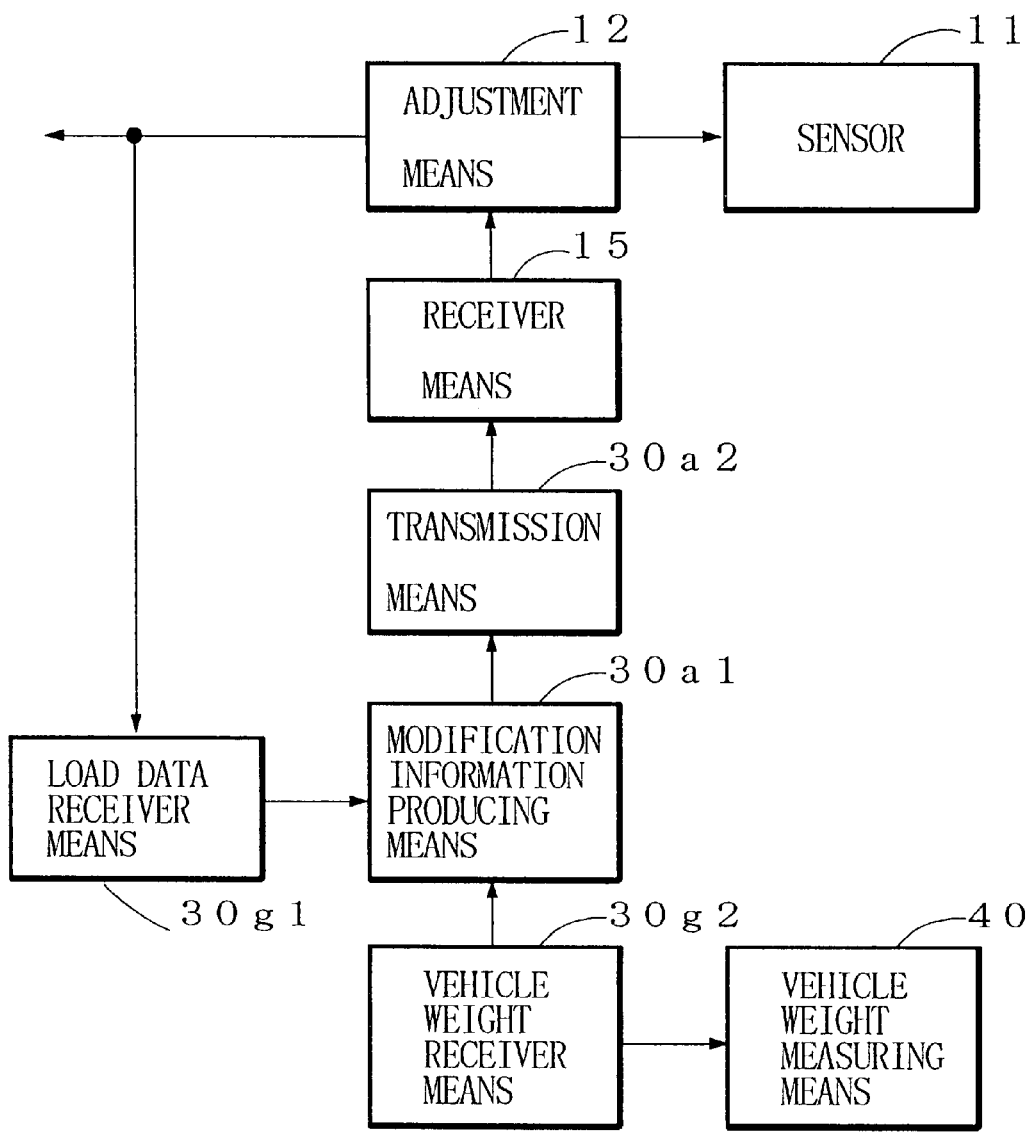
FIG. 1 is a block diagram showing a general configuration of a sensor unit according to the present invention.
Figure 2:
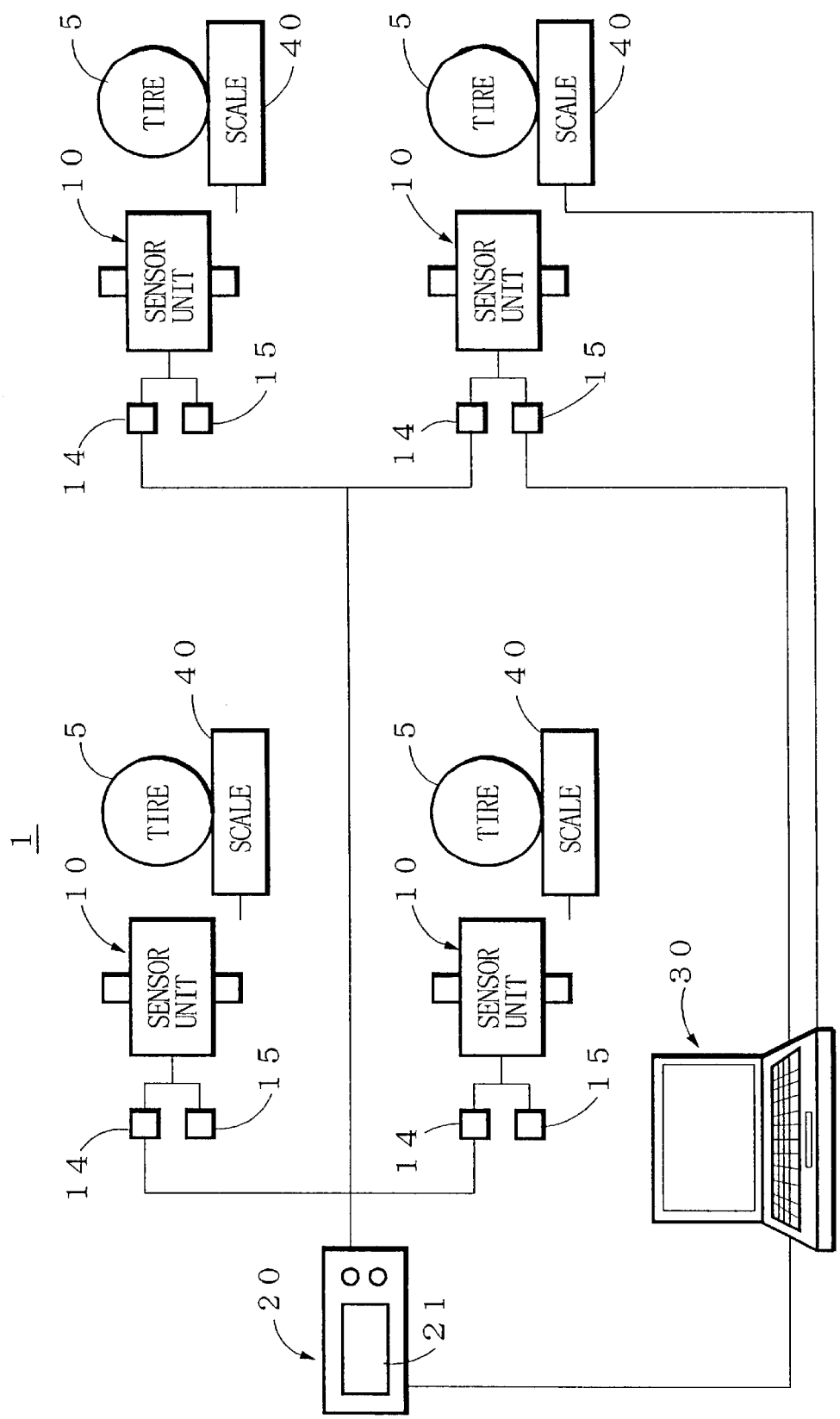
FIG. 2 is an illustration showing a general configuration of a sensor unit control system according to the present invention.

In FIG. 2, reference numeral 1 designates a sensor unit control system having a plurality of sensor units 10, a weight meter 20, a controller 30, and a plurality of scales 40. Each sensor unit 10 is fitted to a portion of a vehicle by welding near a tire 5 disposed at one end of a fore or rear axle of the vehicle. The weight meter 20 is mounted on the vehicle and calculates a dead weight of the vehicle based on load signals supplied from the sensor units 10 to indicate it on a display 21. The controller 30 is used for controlling the sensor units 10. The scale 40 (corresponding to the vehicle weight measuring means described in the invention summary) measures a load carried by the tire 5 to output vehicle weight data corresponding to an actual vehicle weight.

In the embodiment, the vehicle has four wheels so that the sensor unit control system 1 is provided with four sensor units 10. However, the present invention may be applied to, for example, a six-wheel vehicle having six sensor units 10.

Figure 3:
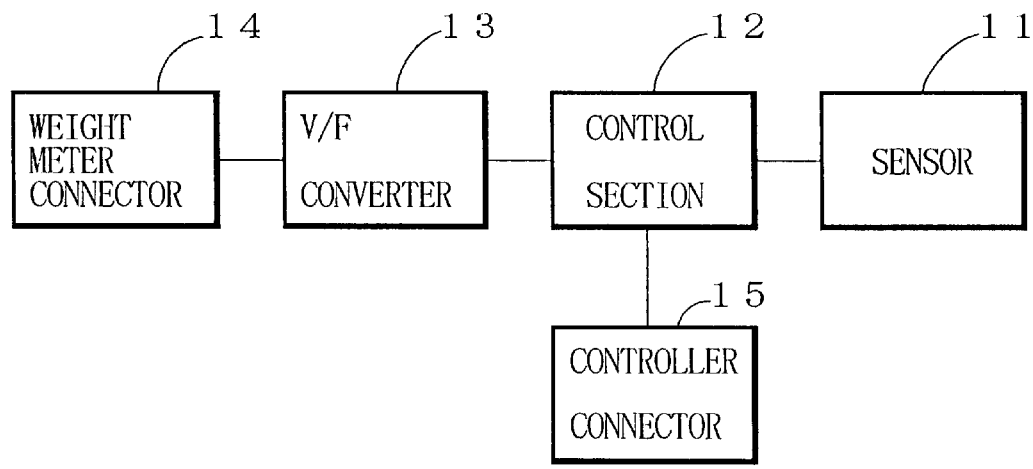
FIG. 3 is a block diagram showing a general configuration of the sensor unit of FIG. 2.

As illustrated in FIG. 3, the sensor unit 10 has a strain gauge sensor 11 for outputting a load signal responsive to a strain amount of a vehicle axle support, a control section 12 (corresponding to the adjustment means described in the invention summary) for amplification and correction of the load signal supplied from the sensor 11, a voltage-to-frequency converter 13 (called as a V/F converter hereinafter) of the load signal adjusted by the control section 12, a connector 14 for transmitting the converted load signal to the weight meter 20, and another connector 15 (corresponding to the receiver mean described in the invention summary) for connection to the controller 30.

The control section 12, which uses an ASIC (application-specific integrated circuit), has an A/D converter for converting a load signal supplied from the sensor 11 to a digital load signal, a modification section for modifying the digital load signal, an amplification section for amplifying the digital load signal, and a D/A converter for converting a digital load signal to an analog load signal. In this embodiment, the control section 12 uses the ASIC. Alternatively, the present invention may use a DSP (digital signal processor).

Figure 4:
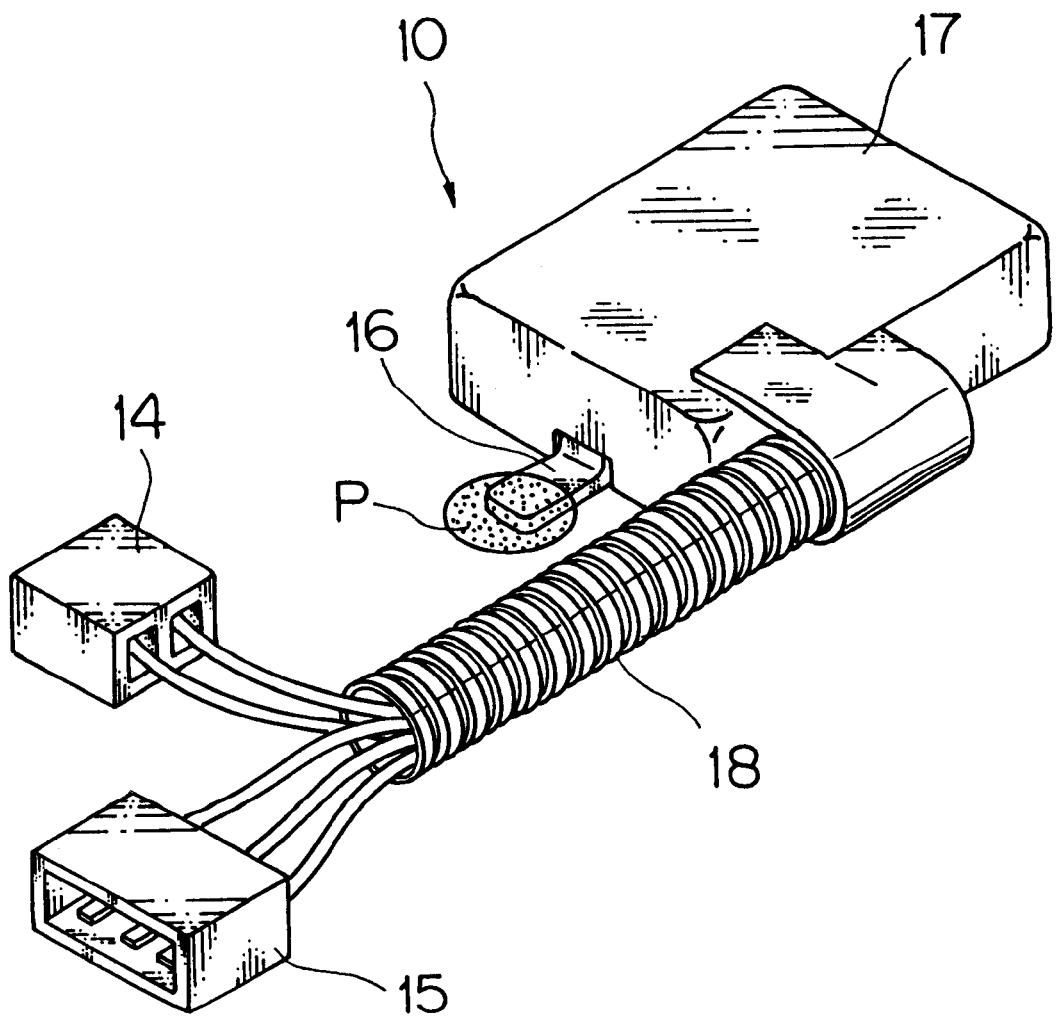
FIG. 4 is a perspective view showing the sensor unit of FIG. 2.

As illustrated in FIG. 4, the sensor unit 10 has a unit main body constituted by a sensor 11 and a metal protection cover 17 for protecting the sensor 11. Each end of the base assembly 16, which is a welded portion, is extended outside of the protection cover 17. After assembling the protection cover 17 to the base assembly 16, each of the base assembly 16 is disposed to be welded to a welding portion P of a vehicle axle support to fit the sensor unit 10 to the vehicle.

Furthermore, a corrugated tube 18 is extended from the protection cover 17 of the sensor unit 10. The corrugated tube 18 guides electrical cables laid therethrough each having an end connected to the weight meter connector 14 or the connector 15. The connector 14 can be connected to the weight meter 20 and the connector 15 can be connected to the controller 30.

As the controller 30 which is positioned outside of the vehicle, there is provided a personal computer having a pre-planed program. The controller 30 is connected to the weight meter 20, the connector 15 of the sensor unit 10, and the scale 40.

Figure 5:
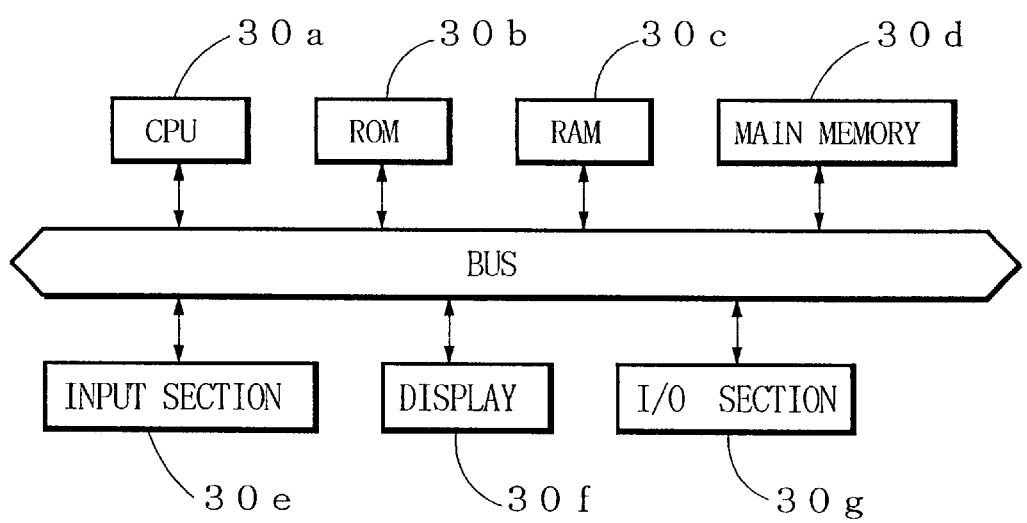
FIG. 5 is an illustration showing a constitution of a controller of FIG. 2.

As illustrated in FIG. 5, the controller 30 has a CPU (central processing unit) 30a controlling operations of the whole system based on a pre-provided program. Through a bus B, the CPU 30a is connected to a ROM (read only memory) 30b for storing a program for the CPU 30a and a RAM (random access memory) 30c for storing various data. The RAM has areas for an execution of the CPU 30a.

The CPU 30a is further connected to a main memory 30d through the bus B. The main memory 30d consists of a hard disc. The main memory 30d stores program files and data files to operate the personal computer as the controller 30. The program files, which are generally installed from CD-ROMs, include programs for adjusting loads obtained in a no-load condition and a load condition of the vehicle. The data files include a temperature coefficient table file to determine a temperature coefficient corresponding to the type of the vehicle and the position of the sensor unit 10.

In this embodiment, the programs and data files are installed from storage mediums such as a CD-ROM and a floppy disc into the main memory 60d of the computer. Alternatively, the programs and data files may be downloaded externally from an interface of the computer through an internet communication and a telephone line. Furthermore, the CPU 30a is connected to an input section 30e having an interface through the bus B. The input section 30e which corresponds to a keyboard and a click mouse input various data into the CPU 30a through the bus B.

The bus B is also connected to a liquid crystal display 30f. Indication data for the display 30f are supplied from the CPU 30a.

The bus B is connected to an input/output section 30g (called as an I/O section hereinafter). The I/O section 30g is connected to the weight meter 20, the connector 15 provided for adjusting the sensor units 10, and the scales 40. The I/O section 30g inputs load data supplied from the weight meter 20 and vehicle weight data supplied from the scale 40 into the CPU 30a. The CPU 30a produces a modification information for modifying the sensor unit 10. The modification information is outputted from the control section 12 to the sensor unit 10 through the I/O section 30g. It will be understood that the I/O section 30g corresponds to the load data receiver mean and the vehicle weight receiver mean of the invention summary.

The sensor unit 10 is assembled as a unit main body unitarily having a sensor 11 and a control section (adjustment means) 12. The sensor unit 10 is welded to an axle support of the vehicle. After the welding of the sensor unit 10, the modification information for modifying the load signal is received outside of the unit main body through the connector (receiver mean) 15. Thereafter, the load signal is adjusted by the control section 12 responsive to the modification information to be outputted from the sensor 11.

Thus, the sensor 11 and the control section 12 can be unitarily assembled to define the sensor unit 10, since the control section (adjustment means) 12 adjusts the load signal from the sensor 11 responsive to the received modification information.

Accordingly, the present invention provides the sensor unit 10 which can be applied to different types of vehicles, since the modification information provided outside of the unit main body can adjust the adjustment means 12. Furthermore, this eliminates handwork for an offset adjustment which has been necessary after the mounting of the conventional sensor, improving a workability thereof.

The sensor unit 10 is easily connected to the controller 30 through the connector 15 disposed outside of the unit main body. Even when the sensor unit 10 is positioned near an axle of the vehicle, the connector 15 is positioned such that the controller 30 can be easily connected thereto. This allows an easier work for mounting the sensor.

Next, referring to a flowchart of FIG. 6, an adjustment process of a no-load condition of a vehicle will be discussed. The adjustment process is executed by CPU 30a of the controller 30 according to the present invention.

In the vehicle no-load condition, a no-load condition adjustment program stored in the main memory 30d starts. In step S31 of FIG. 6, it is determined whether load data has been inputted from the sensor unit 10 through the I/O section 30g. When it is determined that no load data have been inputted (N in step S31), step 31 will be repeated until load data are inputted from the sensor unit 10. Meanwhile, when it is determined that load data have been inputted (Y in step S31), the load data are stored in RAM 30c and the execution of the program execution goes to step S32.

In step S32, it is determined whether the load data received from the sensor unit 10 are within a pre-determined initial range. More definitely, it is determined that the load data, which are converted to frequencies, are within 300 Hz±10 Hz. Note that, in this embodiment, the frequency of 300 Hz is set as an output of the sensor unit 10 at a no-load condition of the vehicle. That is because an output frequency from the sensor unit 10 may be always larger than 0 (zero) Hz, even when the vehicle is lifted by a jack.

When step S32 determines that the load data are not within the pre-determined range (N in step S32), the program execution goes to step S33. Step S33 carries out an offset modification process of the load data. That is, an offset modification information for varying the output of the sensor unit 10 to 300 Hz is produced in RAM 30c based on the load data supplied from the sensor unit 10. The offset modification information is transmitted through the I/O section 30g to the control section 12 of the sensor unit 10. The control section 12 carries out an offset adjustment of the load data and the program execution goes to step S31 again.

For the offset adjustment of the load data in the no-load condition, the determination process of step S32 is repeated until the load data supplied from the sensor unit 10 become within the pre-determined range.

Meanwhile, when step S32 determines that the load data are within the pre-determined range (Y in step S32), that is, when no offset adjustment is required, the program execution goes to step S34. Step S34 provides data of a vehicle type and a location of the sensor unit 10. Step 34 also produces input data indication information in RAM 30c to indicate the information on the display 30f. The information indicated on the display 30f is used for inputting the data of the vehicle type and the location of the sensor unit 10. The type and location data are inputted in an input screen of the display 30f and is stored in RAM 30c. Thereafter, the program execution goes to step S35.

Step S35 carries out a temperature coefficient table providing process, so that RAM 30c is provided with a temperature coefficient table from a temperature coefficient table file of the main memory 30*d*. From the temperature coefficient table, temperature coefficient data corresponding to the type and location data stored in RAM 30*c* are obtained. Thereafter, the program execution goes step S36.

Step S36 carries out a process for outputting a temperature coefficient modification information. The temperature coefficient modification information is used for modifying a temperature coefficient to vary load data at the control section 12 of the sensor unit 10. The temperature coefficient modification information is produced in RAM 30*c* based on the obtained temperature coefficient data and is transmitted through the I/O section 30*g* to the control section 12 of the sensor unit 10. The control section 12 uses the temperature coefficient modification information to make an output adjustment of the sensor at the no-load condition of the vehicle. Next, referring to a flowchart of FIG. 7, an adjustment process of a load condition of the vehicle, which is executed by CPU 30*a* of the controller 30, will be discussed.

For example, in a vehicle load condition in which a pre-determined amount weight is positioned at a center of a carrier of the vehicle, a load condition adjusting program stored in the main memory 30*d* is started. In the execution of the load condition adjusting program of FIG. 7, Step S61 determines whether load data have been inputted from the sensor unit 10 through the I/O section 30*g*. When the determination is negative (N in step S61), the determination step is repeated until the sensor unit 10 transmits load data. Meanwhile, when the determination is affirmative (Y in step S61), the load data are stored in RAM 30*c*. Thereafter, the program execution goes to step S62.

Step S62 carries out a vehicle weight data providing process, so that vehicle weight data are supplied from the scales 40 to RAM 30*c*. Thereafter, the program execution goes to step S63.

Step S63 carries out a reference data calculation process. For example, when the pre-determined weight is 1 ton, each load carried by each of four tires 5 disposed in left/right and fore/aft sides of the vehicle carrier is 0.25 ton. That is, reference data of each sensor unit 10 are calculated based on the vehicle weight data stored in RAM 30*c*. Thereafter, the program execution goes to step S64.

Step S64 compares the load data stored in RAM 30*c* with the reference data. Thereby, it is determined whether a sensitivity (amplification ratio) adjustment (amplification ratio) of the sensor 11 is necessary. When the sensitivity adjustment of the sensor 11 is unnecessary (N in step S64), the vehicle weight data providing process is ended. Meanwhile, when a sensitivity adjustment of the sensor 11 is necessary (Y in step S64), the program execution goes to step S65.

Step S65 carries out a sensitivity modification information output process based on the load data of RAM 30*c* and the reference data. Thereby, sensitivity adjustment modification information is produced in RAM 30*c* and is transmitted through the I/O section 30*g* to the control section 12 of the sensor unit 10. Thereafter, the program execution returns to step S61.

The control section 12 of the sensor unit 10 carries out a sensitivity adjustment. Steps S61 to S65 are repeated until step S64 determines that no sensitivity adjustment of the load data supplied from the sensor unit 10 is required (N in step S64).

As described above, each of steps S33, S36, and S65 produces each of the offset modification information, the temperature coefficient modification information, and the sensitivity modification information. The modification information is transmitted to the sensor unit 10. Therefore, it is understood that CPU 30*a* corresponds to the modification information producing mean and the transmission means described in the summary of the invention.

Figure 8:
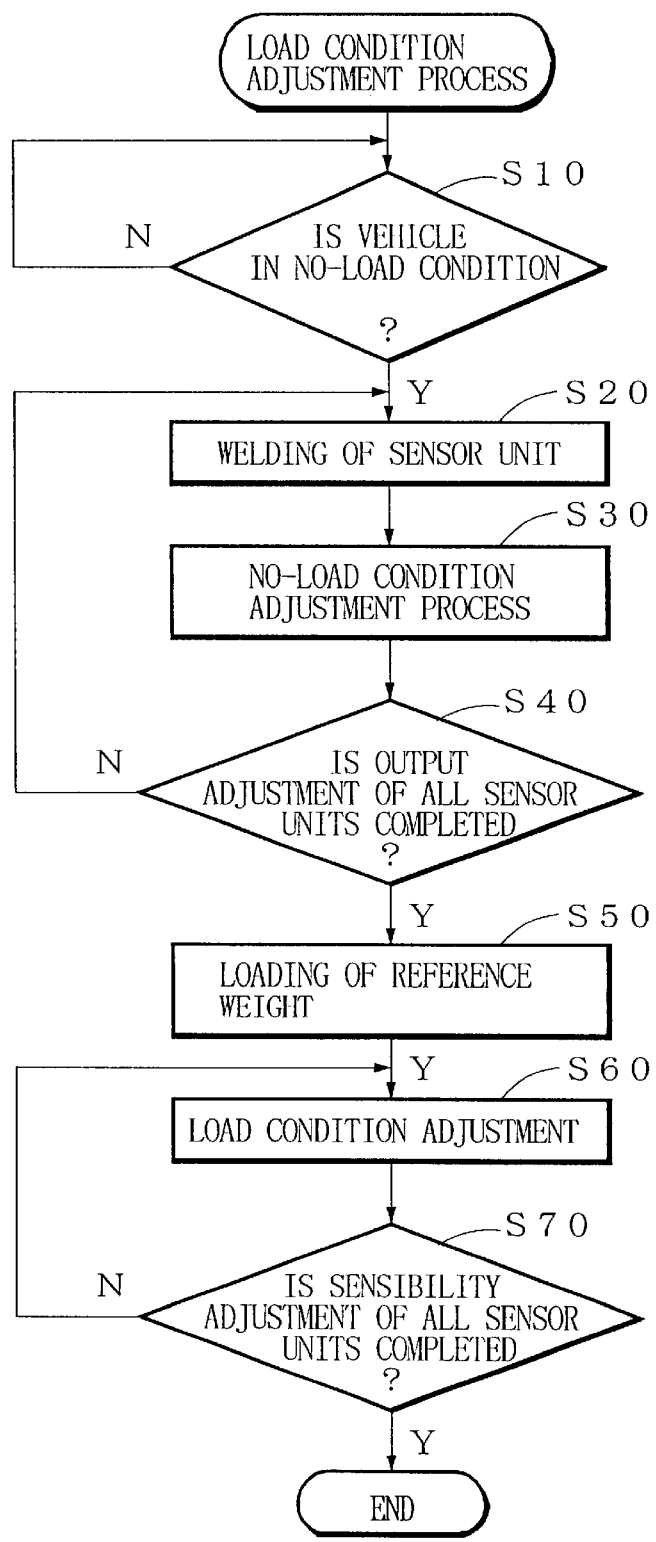
FIG. 8 is a flowchart showing a general process of the sensor unit control system of FIG. 2.

Next, referring to a flowchart of FIG. 8, an operation of the embodiment will be discussed. To simplify the discussion, a modification process only of the sensor unit 10 positioned in a rear, left side of the vehicle will be described in detail.

First, the tires 5 of the vehicle in a no-load condition are placed on the scales 40. The weight meter 20 mounted on the vehicle is connected to the controller 30 positioned outside of the vehicle. The sensor unit 10 is welded to the pre-determined welding portion P (see FIG. 4) near an axle in a rear, left side of the vehicle. After the completion of the welding, the sensor unit 10 is connected to the weight meter 20 through the connector 14 and is connected to the controller 30 through the connector 15 (step S20).

Figure 6:
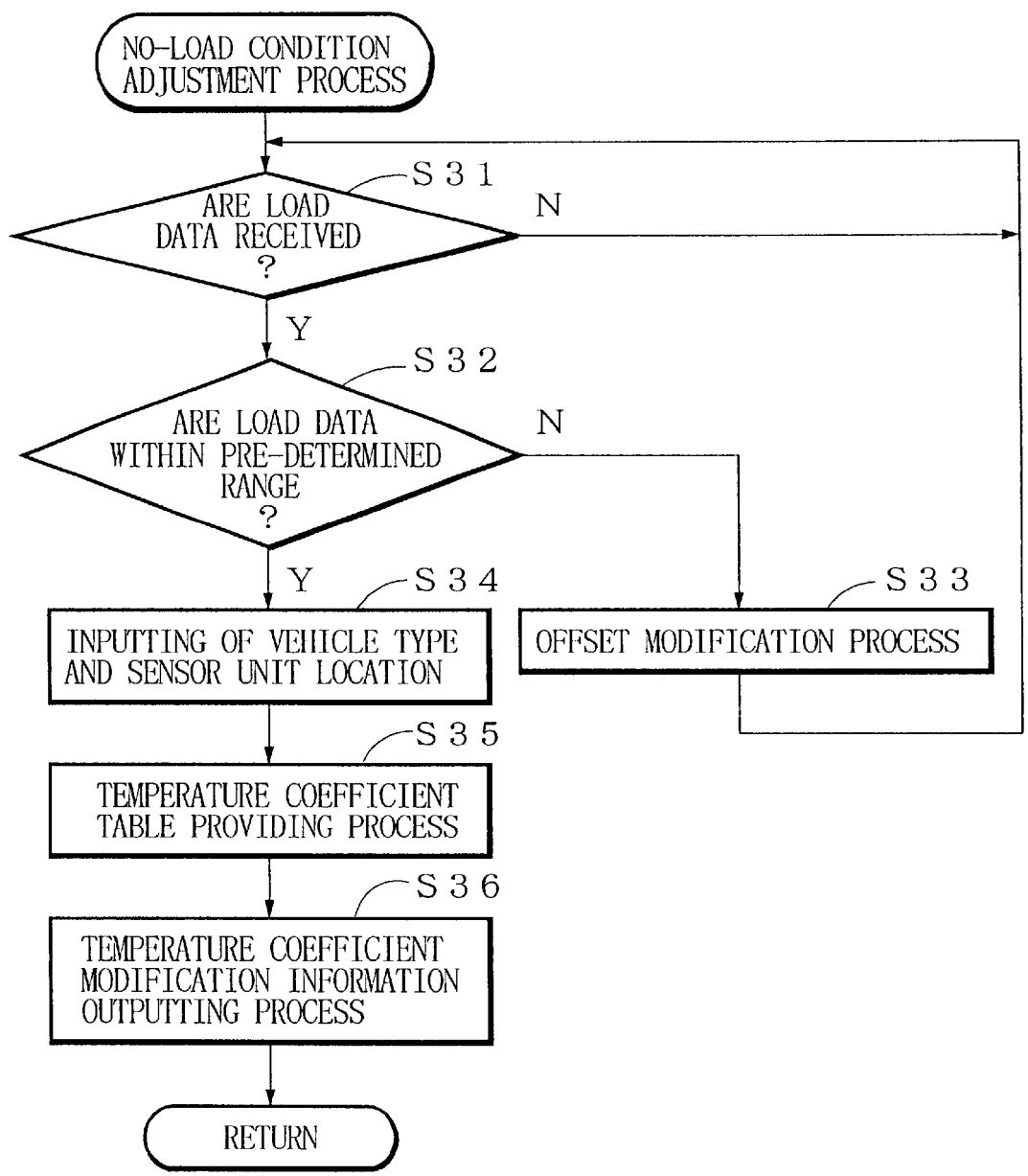
FIG. 6 is a flowchart showing an adjustment process concerning a no-load condition of a vehicle, the process being executed by a CPU of FIG. 5.
Figure 7:
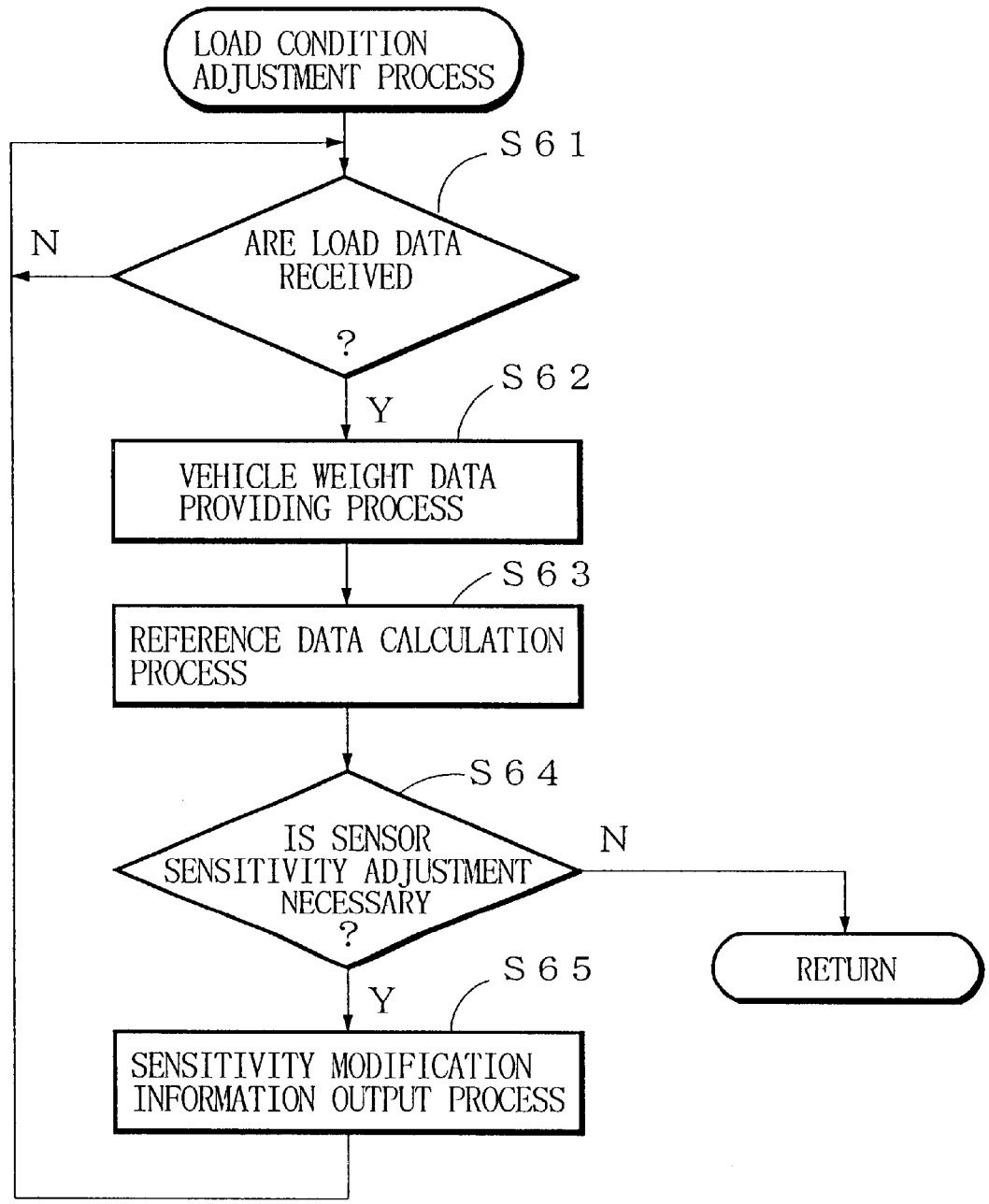
FIG. 7 is a flowchart showing an adjustment process concerning a load condition of the vehicle, the process being executed by the CPU of FIG. 5.

The controller 30 carries out the no-load condition adjustment process described of FIG. 6. When the load data received from the sensor unit 10 are not within the pre-determined initial range of 300 Hz±10 Hz (N in step S32), offset modification information for varying an output of the sensor unit 10 to 300 Hz is produced in RAM 30*c* based on the received load data. The offset modification information is transmitted to sensor unit 10. After the sensor unit 10 receives the offset modification information, the load signal transmitted from the sensor 11 is adjusted by the adjustment means 12 responsive to the offset modification information. Then, the adjusted load signal is externally outputted from the sensor unit 10 (step S30). Thereafter, a temperature coefficient table is obtained from the temperature coefficient table file preliminarily stored in the main memory 30*d* so as to correspond to the vehicle type and the sensor position. Based on the obtained temperature coefficient table, a temperature coefficient modification information is produced for modifying a temperature coefficient used for a load data modification. The temperature coefficient modification information is transmitted to the control section 12 of the sensor unit 10 (steps S34 to S36)

After the completion of a sensor output adjustment of all (four) the sensor units 10 at a no-load condition of the vehicle (step S40), a pre-determined amount of reference weights are mounted on a central position of the carrier of the vehicle (step S50). Then, the controller 30 is connected to the scales 40, and the controller 30 carries out the load condition adjustment process of FIG. 7. The controller 30 receives the load data from the sensor units 10 and also receives the vehicle weight data from the scales 40 (steps S61 and S62).

Based on the vehicle weight data received from the scales 40, reference data are calculated for each sensor unit 10 (step S63). The reference data are compared with the load data. When a sensitivity adjustment of the sensor 11 of the sensor unit 10 is necessary (Y in step S64), the sensitivity adjustment modification information is produced for adjusting the sensitivity of the load signal received from the sensor 11 at the control section 12 of the sensor unit 10.

Based on the sensitivity adjustment modification information, the control section 12 carries out the sensitivity adjustment (step S65). When the load condition adjustment is finished for all the sensor units 10 positioned at the left/right and fore/rear sides of the vehicle, the adjustment of the sensor units 10 is completed.

As discussed above, the offset modification information, the temperature coefficient, and the sensitivity are produced for the vehicle fitted with the sensor units 10. The modification information is transmitted to the sensor unit 10. The sensor unit 10 adjusts the load signal responsive to the modification information and outputs the adjusted load signal. This allows an easy adjustment of the sensor 11 and the control section (adjustment means) 12 which are unitarily assembled into the sensor unit 10.

Thus, the modification information corresponding to the vehicle type is outputted from the sensor unit 11. Accordingly, the sensor unit 11 is adjusted according to the vehicle type. This provides a sensor unit control system applied to different types of vehicles.

The CPU of the controller 30 produces modification information based on the load data received from the sensor units and the initial set data of a no-load condition of the vehicle. Thus, even when the welding of the sensor 11 changes an output of the sensor 11, the control section (adjustment means) 12 can correct the output of the sensor 11 based on the load signal transmitted from the sensor unit 10.

Moreover, the vehicle load data are obtained by the actual measurement of the scales (vehicle weight measuring means) 40. Based on the vehicle load data and the load data transmitted from the sensor 11, the modification information is produced. Thus, the modification information allows the control section (adjustment means) 12 to more correctly adjust the sensor unit 10.

In the embodiment, the connector 15 is provided for connecting the receiver means of the sensor unit 10 to the controller 30. Alternatively, the receiver mean of the sensor unit 10 may be a communication section which allows transmission and reception of signals for an external instrument with wire or wireless communication.

In the above-mentioned embodiment, the sensor unit control system has the controller 30 connected to the sensor unit 10. The sensor unit 10 may receive the load signal responsive to an output requiring signal.

For example, the sensor unit 10 may be connected to a LAN provided on the vehicle to use for an intelligent communication system. For the purpose, an interface with the LAN is added to the configuration illustrated in FIG. 3. The LAN transmits the load signal to a vehicle control unit for various kinds of control operations of the vehicle.

What is claimed is:

1. A sensor unit control system comprising:

a sensor unit having a unit main body unitarily including a sensor fitted to an automobile vehicle for producing a load signal responsive to a load carried by the vehicle and an adjustment means adjusting the load signal supplied from the sensor to output externally the adjusted load signal, wherein the sensor unit includes a receiver means positioned outside of the unit main body for receiving modification information for modifying the adjustment of the load signal, and the adjustment means adjusts the load signal to output the load signal after the receiver means receives the modification information, said sensor unit control system further comprising;
    a modification information producing means for producing a modification information responsive to a state of the vehicle,
    a transmission means for transmitting the modification information produced by the modification information producing means to the receiver means of the sensor unit, and
    a load data receiver means for receiving load data which are outputted from the sensor unit, the load data being related to the load signal,
    wherein the modification information producing means produces the modification information based on a pre-provided vehicle weight data and the load data received by the receiver means.

2. The sensor unit control system set forth in claim 1, wherein the receiver means serves as a coupler for coupling an external instrument.

3. The sensor unit control system set forth in claim 1, wherein the receiver means receives externally an output timing signal of the load signal, and the adjustment means outputs the load signal in response to the output timing signal received by the receiver means.

4. The sensor unit control system set forth in claim 1 further comprising a vehicle weight measuring means for measuring a vehicle weight of the vehicle to output vehicle weight data and a vehicle weight receiver means for receiving the vehicle weight data from the vehicle weight measuring means, wherein the modification information producing means provides the vehicle load data based on the vehicle weight data received by the vehicle weight receiver means.

* * * * *